(12) United States Patent
Chang

(10) Patent No.: US 7,080,574 B2
(45) Date of Patent: Jul. 25, 2006

(54) CRANK STRUCTURE FOR BICYCLE PEDAL

(76) Inventor: Wen-Yao Chang, 39, Lane 582, Shan Chiao Road, Sec. 2, Yuan Lin Town, Changhua (TW)

( * ) Notice: Subject to any disclaimer, the term of this patent is extended or adjusted under 35 U.S.C. 154(b) by 388 days.

(21) Appl. No.: 10/445,834

(22) Filed: May 28, 2003

(65) Prior Publication Data

US 2004/0237709 A1  Dec. 2, 2004

(51) Int. Cl.
    *G05G 1/14* (2006.01)
(52) U.S. Cl. .................. 74/594.1; 74/594.4; 403/4
(58) Field of Classification Search .............. 74/594.4, 74/594.6, 594.1; B62M 3/08; G05G 1/14
    See application file for complete search history.

(56) References Cited

U.S. PATENT DOCUMENTS

| | | | | |
|---|---|---|---|---|
| 4,446,753 A | * | 5/1984 | Nagano | 74/594.1 |
| 5,387,047 A | * | 2/1995 | Korpi | 403/4 |
| 5,586,472 A | * | 12/1996 | Lin | 74/594.1 |
| 6,568,296 B1 | * | 5/2003 | Lin | 74/594.1 |
| 2003/0061900 A1 | * | 4/2003 | Smith | 74/594.1 |
| 2005/0178236 A1 | * | 8/2005 | Crozet et al. | 74/594.1 |

FOREIGN PATENT DOCUMENTS

| | | | |
|---|---|---|---|
| DE | 43 42 891 A1 | * | 5/1994 |
| DE | 100 07 841 A1 | * | 9/2001 |
| EP | 0 233 423 | * | 8/1987 |
| JP | 2000-289680 | * | 10/2000 |

* cited by examiner

Primary Examiner—Vinh T. Luong
(74) Attorney, Agent, or Firm—Rabin & Berdo, P.C.

(57) ABSTRACT

A crank structure for a bicycle pedal. A front outer thread of a cylindrical sleeve has a same rotary direction as an inner thread hole of the crank, and the rear outer thread has the opposite rotary direction to that of the front outer thread. The inner thread rotary direction of the cylindrical sleeve is the same as that of an outer thread of a bolt protruding from a pedal, and opposite edges of the two each has a hole, so that after the front outer thread of the cylindrical sleeve is secured to the thread of a threaded hole in the crank. A nut is used to lock the rear outer thread in order to limit the rotation. The bolt is locked into the inner thread of the hole of the cylindrical sleeve for the assembly in order to attain the effects of securely mounting and easily detaching the crank structure.

1 Claim, 4 Drawing Sheets

FIG.1-A
PRIOR ART

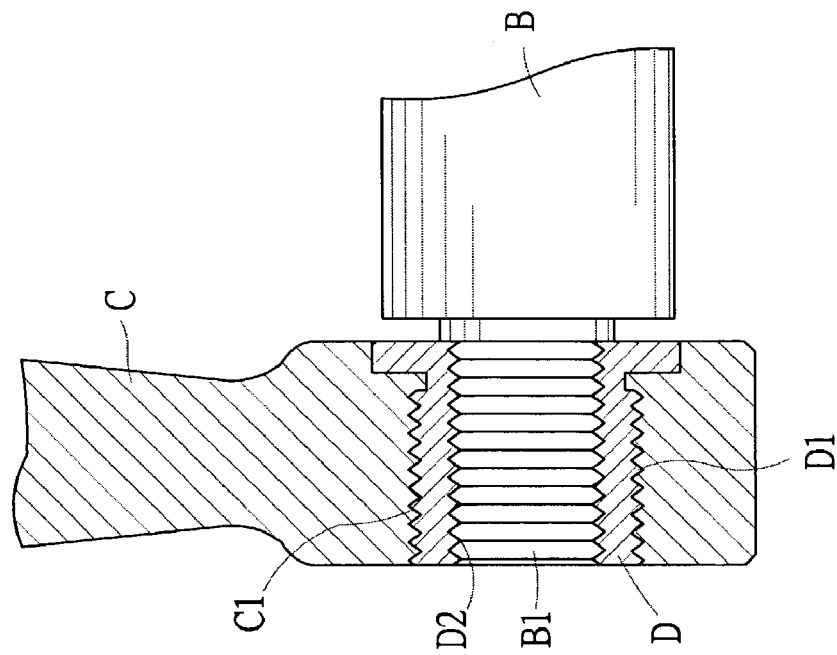
FIG. 1-B PRIOR ART
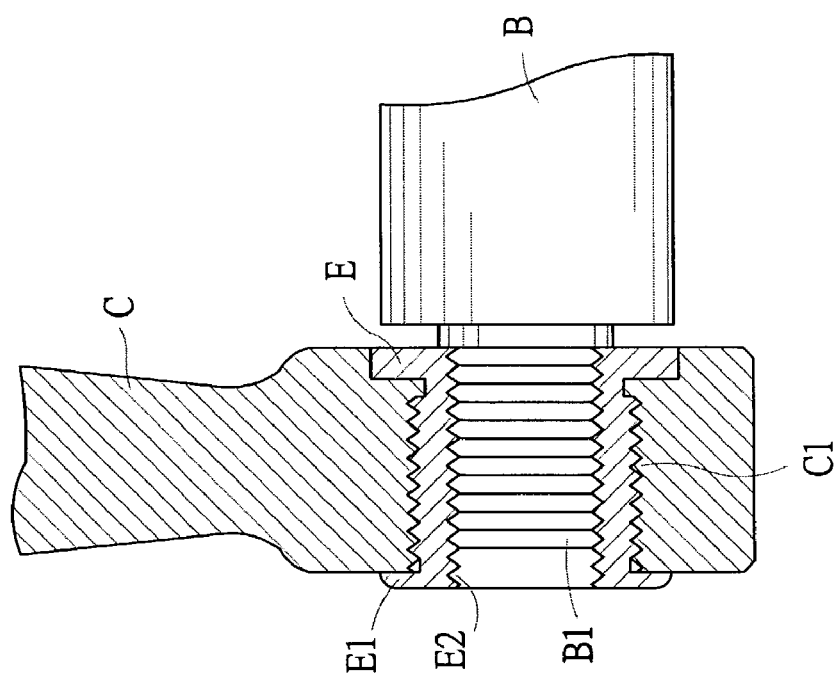
FIG. 2 PRIOR ART

CRANK STRUCTURE FOR BICYCLE PEDAL

BACKGROUND OF THE INVENTION

1. Field of the Invention

This invention relates to an improved crane structure for a bicycle pedal, more particularly to a crank structure having a cylindrical sleeve in an inner thread hole of a crank and two threads respectively disposed at a front section and a rear section on the outer periphery of the cylindrical sleeve and substantially in opposite rotary directions with each other to respectively limit the screw connection of the inner thread of the crank and the nut in order to attain the effects of securely mounting and easily detaching the crank structure.

2. Description of the Related Art

In general, a bicycle A provides a crank C for coupling a pedal B as shown in FIG. 1A. In the figure, a hole is disposed each at a front section and a rear section of the crank C, and the hole at the front section is coupled with an axial rod A1 of the bicycle body, and the inner thread hole C1 at the rear section is coupled with a bolt B1 protruding from the pedal B by a screw in order to provide a pedaling movement by the rider's legs. However, the entire body of the present bicycle emphasizes light weight. Therefore, traditional steel material is no longer adopted, but a light-weight aluminum alloy material is used instead, and such material also applies to the crank C naturally. However, the crank made of aluminium alloy material is unable to withstand the strong force exerted on the inner thread hole C1 at the rear section of the crank C, and thus manufacturers usually install a wear-proof cylindrial sleeve D onto the inner thread hole C1 in the crank C. An outer thread D1 formed on the outer periphery of the cylinidrical sleeve D has the same rotary direction with the inner thread hole C1 in the crank C; and an inner thread D2 formed on the inner wall has the same rotray direction with the bolt B1 that protrudes from the pedal B, such that after the outer thread D1 on the surface of the cylindrical sleeve D is secured into the inner screw hole C1 of the crank C as a whole, the inner thread D2 on the inner wall of the outer thread D1 is coupled with a bolt B1 protruding from the pedal B (as shown in FIG. 1B) to strengthen the stability of connecting the crank C with the pedal B with the assembling of the cylindrical sleeve D.

Although such method can attain the purpose of strengthening the resistance to shocks and vibrations, it also causes the cylindrical sleeve D to loosen and fall off due to the shocks and vibrations produced when the bicycle is running on an uneven road surface. Therefore an improved connection method as shown in FIG. 2 was suggested. After the cylindrical sleeve E is coupled, the end section E1 is spread out to attach onto the outside of the inner thread hole C1 of the crank C to constitute a positioning after the cylindrical sleeve is installed, but such method may damage the inner thread E2 at the end section E1 of the cylindrical sleeve E, and cause the bolt B1 protruding from the pedal B unable to be fully screwed for the connection.

SUMMARY OF THE INVENTION

The objective of this invention is to provide an improved crank structure for a bicycle pedal, comprising a cylindrical sleeve disposed in a thread hole of a crank and two outer threads substantially in the opposite rotary directions to each other disposed at the front and rear sections of the outer periphery of the cylindrical sleeve; wherein the outer thread at the front section has a same rotary direction with the inner thread hole in the crank, and the outer thread at the rear section has the opposite rotary direction with the outer thread at the front section; the rotary direction of the inner thread disposed in the cylindrical sleeve is the same as that of the bolt that protrudes from a pedal, and the edge of the two each has two holes, so that after the outer thread at the front section of the cylindrical sleeve is secured to the inner thread hole in the crank and a nut is used to lock the outer thread at the rear section in order to limit the rotation, the bolt of the pedal is then locked onto the inner thread of the hole of the cylindrical sleeve for assembling. The outer threads produced at the front and rear sections of the outer periphery of the cylindrical sleeve so produced are in the opposite direction to each other to respectively limit the screw connection of the thread hole in the crank and nut in order to attain the effects of securely mounting and easily detaching the crank structure.

For ease of understanding the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which:

FIG. 2 is a cross-sectional diagram of the assembled parts of another structure according to the prior art.

DETAILED DESCRIPTION OF THE PREFERRED EMBODIMENTS

Figure 1:
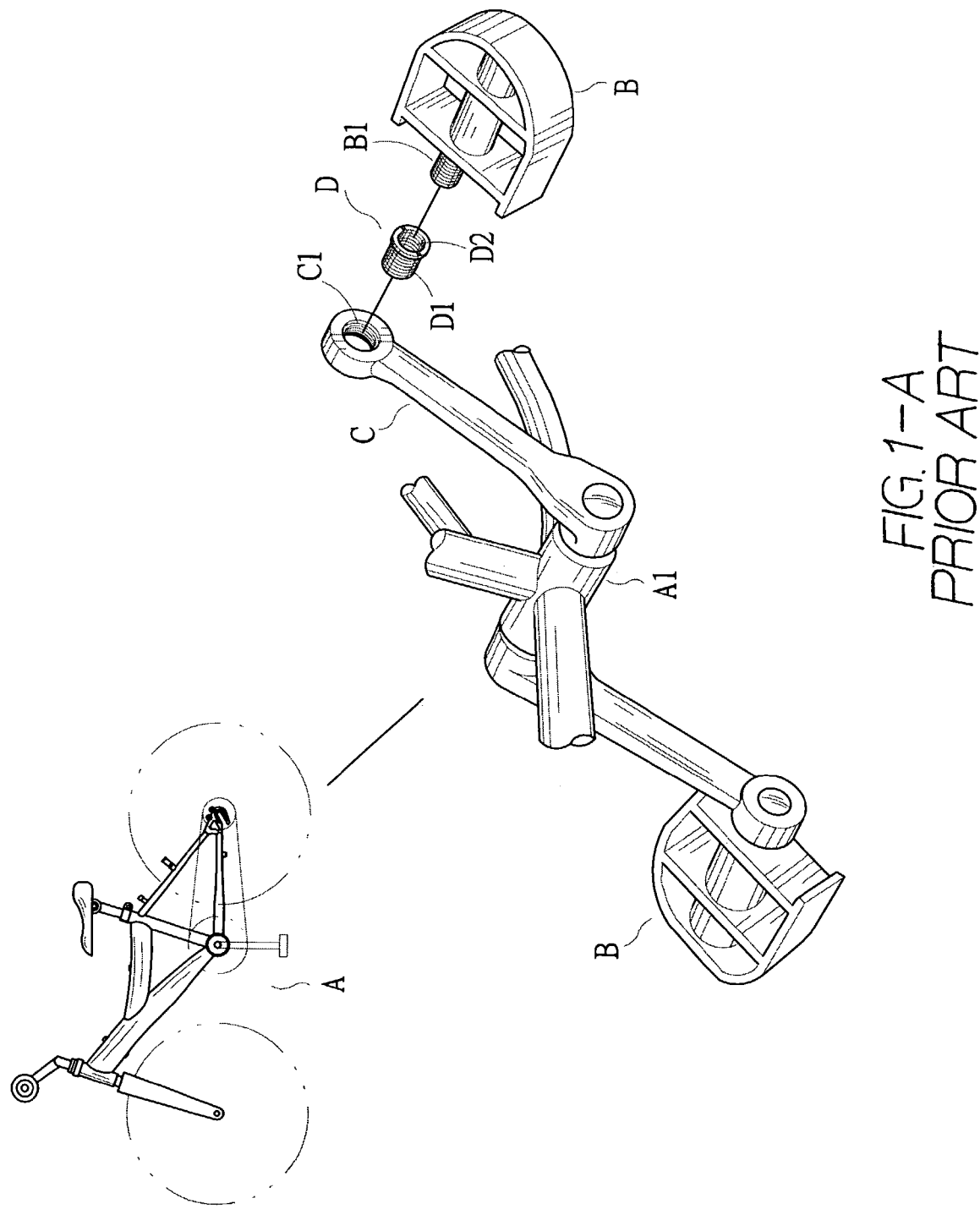
FIG. 1A is a perspective diagram of the disassembled parts of a structure according to the prior art.
FIG. 1B is a cross-sectional diagram of the assembled parts of a structure according to the prior art.
Figure 3:
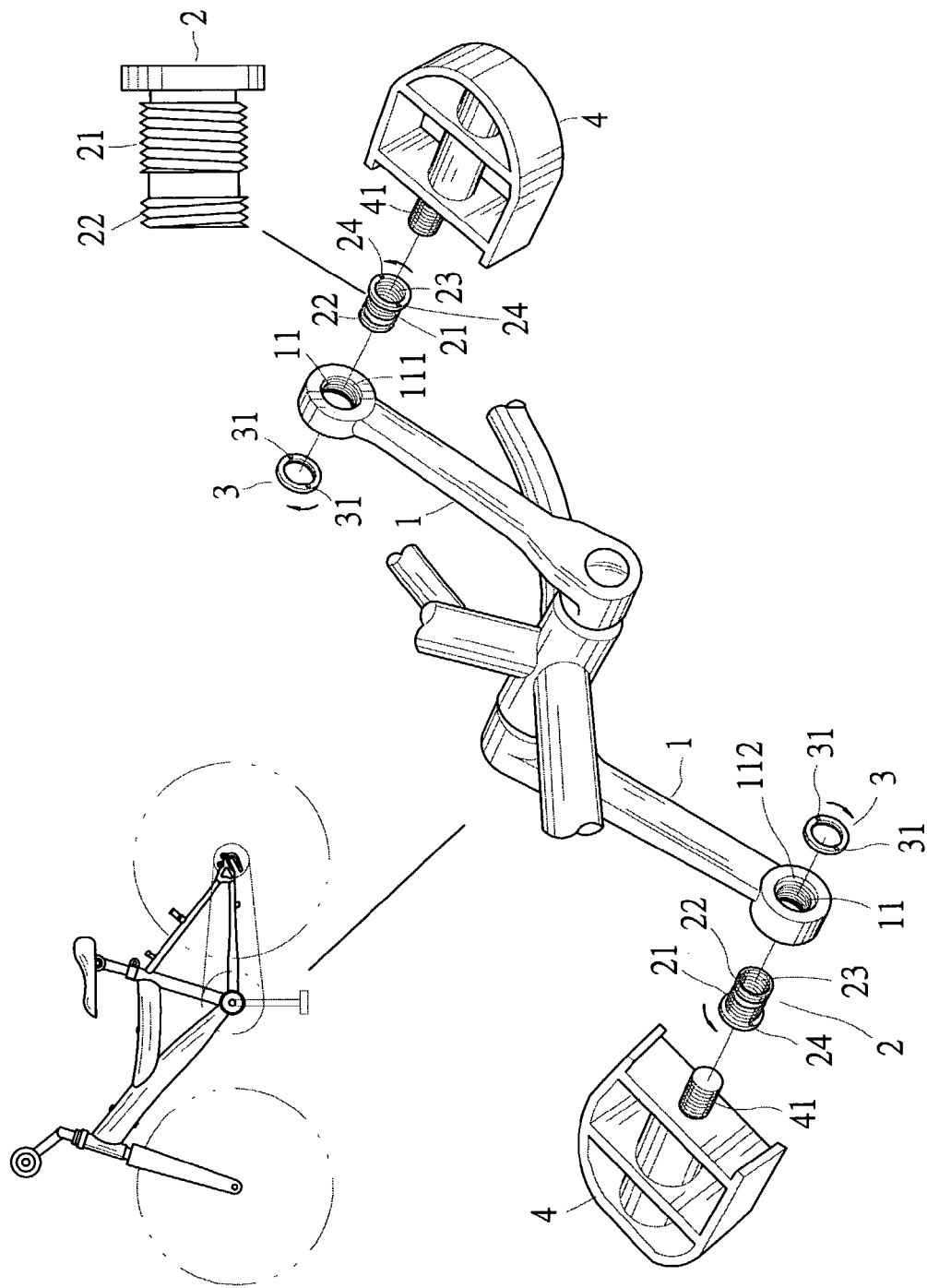
FIG. 3 is a perspective diagram of the disassembled parts of the present invention.
Figure 4:
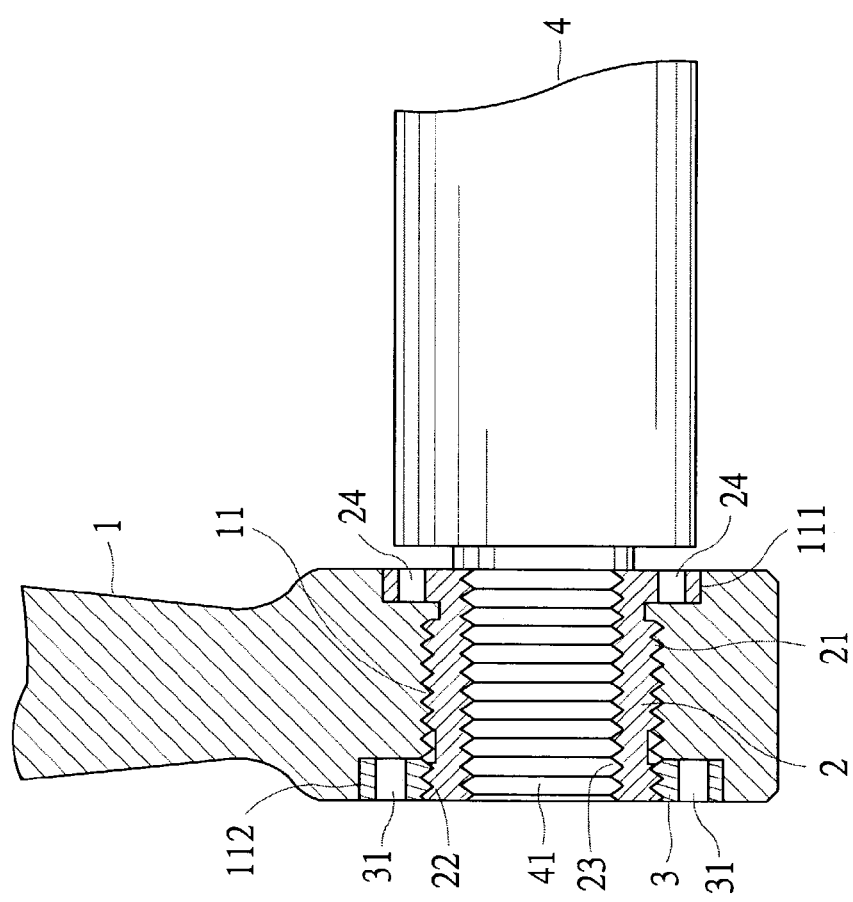
FIG. 4 is a cross-sectional diagram of the assembled parts of the structure according to the present invention.

Referring to FIGS. 3 and 4, an improved crank structure for a bicycle pedal according to the present invention comprises recesses 111, 112 respectively disposed on opposite sides of the opening of an inner thread hole 11 in a crank 1 for installing a cylindrical sleeve 2 and a nut 3, and two outer threads 21 and 22 respectively disposed on a front section and a rear section of the periphery of the cylindrical sleeve 2 and substantially in opposite rotary directions with respect to each other. In other words, the outer thread 21 at the front section of the cylindrical sleeve 2 has a rotary direction that is the same as that of the inner thread hole 11 of the crank 1 (it is a left thread for the crank on the left side), and the outer thread 22 (such as a right thread) at the rear section has a rotary direction opposite to that of the outer thread 21 (such as a left thread) at the front section, but has a rotary direction (such as a right thread) that is the same as that of the nut. The inner thread 23 disposed in the cylindrical sleeve 2 has the rotary direction (such as a right thread) with that of a bolt 41 protruding from the pedal 4. The right crank and the left crank extend in opposite directions, and the edge of the cylindrical sleeve 2 and the nut 3 each has two holes 24, 31 for providing a tool to pass through for the screwing.

By securing the outer thread 21 at the front section of the cylindrical sleeve 2 into the inner thread hole 11 of the crank 1, the cylindrical sleeve 2 is located in the recess 111 at the opening of the inner thread hole 11 in the crank 1, and the outer thread 22 at the rear section is located in the recess 112 at the opening of the inner thread 11 in the crank 1 for securing a nut 3 onto the outer thread 22 in the recess 112 to limit the positioning. A bolt 41 of the pedal 4 is then secured onto the inner thread 23 in the hole of the cylindrical sleeve 2 for the assembling (as shown in FIG. 4). Such arrangement not only allows the cylindrical sleeve 2 to have a stronger shock absorbent, but also prevents the crank 1 from being loosened once the bicycle is riding on an uneven road surface, since the two outer threads 21, 22 respectively disposed at the front and rear sections of the outer periphery of the cylindrical sleeve 2 have opposite rotary irections. When the cylindrical sleeve 2 is loosened from the inner thread hole 11 of the rank 1, the cylindrical sleeve 2 and the nut 3 are rotating in opposite directions to tightly connect the two parts. Therefore, the cylindrical sleeve 2 will not be secured too tight or too loose or even fall out.

If we need to replace the cylindrical sleeve 2, the two holes 24, 31 at the edge of the cylindrical sleeve 2 and the nut 3 can be used to pass a tool for the screwing operation, which can save the trouble of looking for another tool to remove the cylindrical sleeve 2.

In summation of the above description, the present invention herein enhances the performance than the conventional structure, overcomes the shortcoming of the prior art.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

The invention claimed is:

1. A crank structure for a bicycle pedal, comprising:
a crank having a crank threaded hole;
a cylindrical sleeve disposed in the crank threaded hole;
two outer threads substantially in opposite rotary directions to each other, respectively disposed in a front section and a rear section of an outer periphery of said cylindrical sleeve, wherein the outer thread in the front section is in the same rotary direction as a rotary direction of the crank threaded hole, and outer thread in the rear section is in the opposite rotary direction to the rotary direction of the outer thread in the front section, and the rotary direction of an inner thread disposed in said cylindrical sleeve is the same as the rotary direction of a thread on a bolt protruding from the pedal;
two holes being disposed on respective opposite edges of said cylindrical sleeve and two holes being disposed on respective opposite edges of a nut of the pedal for letting a tool to pass through and rotate;
wherein after the outer thread in the front section of said cylindrical sleeve is locked into the thread of the crank threaded hole and the outer thread in the rear section is locked by the nut to limit the rotation, the bolt being locked into an inner thread in a hole of said cylindrical sleeve for the assembling, such that the outer threads at the front and rear sections of the outer periphery of said cylindrical sleeve are in opposite rotary directions with respect to each other and respectively limit a screw connection of the thread of said crank threaded hole and the nut in order to attain the effects of securely mounting and easily detaching the crank structure.

* * * * *